US012691831B2

(12) United States Patent  
Furutani et al.

(10) Patent No.: US 12,691,831 B2  
(45) Date of Patent: Jul. 28, 2026

(54) VEHICLE FRONT PART STRUCTURE

(71) Applicant: MAZDA MOTOR CORPORATION, Hiroshima (JP)

(72) Inventors: Keisuke Furutani, Hiroshima (JP); Kozo Ishizuka, Hiroshima (JP); Hideaki Fujii, Hiroshima (JP); Ai Hiraiwa, Hiroshima (JP); Misaki Muguruma, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 263 days.

(21) Appl. No.: 18/738,854

(22) Filed: Jun. 10, 2024

(65) Prior Publication Data

US 2024/0424995 A1      Dec. 26, 2024

(30) Foreign Application Priority Data

Jun. 22, 2023      (JP) ................................ 2023-102300

(51) Int. Cl.  
    *B60R 7/06*        (2006.01)  
    *B60R 5/02*        (2006.01)

(52) U.S. Cl.  
    CPC . *B60R 7/06* (2013.01); *B60R 5/02* (2013.01)

(58) Field of Classification Search  
    CPC ................................... B60R 7/06; B60R 5/02  
    See application file for complete search history.

(56) References Cited

U.S. PATENT DOCUMENTS 11,685,315 B2 *  6/2023  Salter ........................ B60R 7/04  
                                     296/37.8  
11,970,137 B2 *  4/2024  Salter ................... B62D 25/087

2022/0289113 A1     9/2022  Salter et al.  
2024/0399964 A1 *  12/2024  Nagano ..................... B60R 5/02  
2024/0424991 A1 *  12/2024  Furutani ................... B60R 5/02

FOREIGN PATENT DOCUMENTS

DE     10 2020 106 560 A1    9/2021  
DE     10 2022 109 830 A1    3/2023  
JP         2020111306 A  *  7/2020  .......... B60R 13/013

OTHER PUBLICATIONS

The extended European search report issued by the European Patent Office on Nov. 8, 2024, which corresponds to European Patent Appliocation No. 24179455.1-1009 and is related to U.S. Appl. No. 18/738,854.

* cited by examiner

*Primary Examiner* — Faye M Fleming  
(74) *Attorney, Agent, or Firm* — Studebaker Brackett PLLC

(57)           ABSTRACT

A vehicle front structure prevents unintentional package movement during travel while allowing access to a trunk from a vehicle cabin side. Embodiments include a vehicle having a front trunk, a glove box, and a communication portion. The front trunk has a housing space at a front of the vehicle to house a package. The glove box is at a front part of a vehicle cabin and has a housing space into and out of which a package can be taken, and a lid to open and close an opening. The communication portion has a communication space providing communication between the housing space of the front trunk and the housing space of the glove box. A raised wall that restricts package movement in the communication space is provided at an opening section of the communication space, such as a front opening at a front end part of the communication space.

14 Claims, 6 Drawing Sheets

VEHICLE FRONT PART STRUCTURE

TECHNICAL FIELD

The present disclosure relates to a vehicle front part structure.

BACKGROUND

German Patent Application Publication No. 102020106560 discloses a vehicle provided with a trunk at a front part. The trunk disclosed in German Patent Application Publication No. 102020106560 is formed of a resin material and arranged below a bonnet at the vehicle front part. A user can open the bonnet and take an object into and out of the trunk.

SUMMARY

However, the trunk disclosed in German Patent Application Publication No. 102020106560 described above is inconvenient because stopping the vehicle and opening the bonnet is necessary every time the trunk is accessed.

Thus, providing a communication portion through which the trunk at the vehicle front part communicates with a vehicle cabin has been considered.

However, with a simple structure in which the trunk at the vehicle front part and the vehicle cabin communicate with each other through the communication portion, a package housed in a front trunk during vehicle traveling can potentially move into the vehicle cabin through the communication portion.

The present disclosure has been made in view of the problem as described above and aims to provide a vehicle front part structure that can prevent unintentional package movement during vehicle traveling while allowing access to a trunk from a vehicle cabin side.

A vehicle front part structure according to an aspect of the present disclosure includes a front trunk disposed at a vehicle front part on a front side of a vehicle cabin of a vehicle and having a front housing space that can house a package; a vehicle cabin side housing portion disposed at a front part of the vehicle cabin, having a vehicle cabin side housing space into and out of which a package can be taken from the vehicle cabin side, and provided with a lid that can open and close an opening of the vehicle cabin side housing space on the vehicle cabin side; a communication portion having a communication space providing communication between the front housing space and the vehicle cabin side housing space; and a movement restriction portion that is provided at the communication portion and restricts package movement in the communication space.

In the vehicle front part structure according to the above-described aspect, since the front trunk at the vehicle front part, the vehicle cabin side housing portion at the vehicle cabin front part, and the communication portion having the communication space providing communication between the front housing space and the vehicle cabin side housing space are provided, it is possible to ensure a housing space in which a package can be accessed from both inside and outside the vehicle cabin while enlarging housing capacity of a trunk of the vehicle.

Moreover, since the movement restriction portion that restricts package movement in the communication space is provided at the communication portion, packages housed in the front trunk or the communication portion can be prevented from unintentionally moving in a front-rear direction during vehicle traveling.

In the vehicle front part structure according to the above-described aspect, the movement restriction portion may be a raised wall that can be displaced between a closed position where movement of the package is restricted by partitioning of at least part of an opening section of the front housing space in the communication space and an opened position where the movement restriction is canceled.

In the vehicle front part structure according to the above-described aspect, it is possible to prevent package movement in the communication space as the raised wall at the closed position restricts package movement by partitioning at least part of an opening section of the communication space in the communication portion during vehicle traveling, and it is possible to smoothly perform package movement in the communication space as the raised wall is displaced from the closed position to the opened position to cancel the movement restriction when a package is taken into and out of the front trunk.

The vehicle front part structure according to the above-described aspect may further include an opening-closing operation portion that is operated to open and close the raised wall.

In the vehicle front part structure according to the above-described aspect, with the opening-closing operation portion, an occupant of the vehicle can optionally open and close the raised wall by performing an operation to open and close the raised wall by using the opening-closing operation portion when desiring to open and close the raised wall.

In the vehicle front part structure according to the above-described aspect, the opening-closing operation portion may include the lid of the vehicle cabin side housing portion, and the raised wall may be opened and closed in coordination with opening-closing operation of the lid.

In the vehicle front part structure according to the above-described aspect, since the opening-closing operation portion includes the lid of the vehicle cabin side housing portion, an operation member for performing an operation to open and close the raised wall does not need to be provided in the vehicle cabin in addition to the lid, and the configuration of the vehicle cabin front part can be simplified.

Moreover, since the raised wall is opened and closed in coordination with opening-closing operation of the lid, an operation to open and close the raised wall can be easily performed.

Further, when the lid of the vehicle cabin side housing portion is opened to take a package in and out, the raised wall can be opened in coordination with opening operation of the lid and an occupant can move the package to an optional place in the front trunk or the communication portion while visually recognizing the package.

In the vehicle front part structure according to the above-described aspect, the opening-closing operation portion may include an operation member that extends in a longitudinal direction of the communication portion and opens and closes the raised wall by moving in the longitudinal direction, and the operation member may include a coupling end part coupled to the raised wall, and an operation end part provided inside or around the vehicle cabin side housing portion.

With the vehicle front part structure according to the above-described aspect, an occupant can easily perform an operation to open and close the raised wall only by holding the operation end part of the operation member in the vehicle cabin and operating the operation member. Moreover, it is possible to open and close the raised wall at an optional timing while maintaining a state in which the lid of the vehicle cabin side housing portion is opened, and thus an occupant in the vehicle cabin can reliably check an opened-closed state of the raised wall.

In the vehicle front part structure according to the above-described aspect, the raised wall can open and close the whole area of the opening section of the communication space in a closed state, and the vehicle front part structure may further include a seal member that provides blockage between a periphery of the raised wall and an inner peripheral surface of the communication space in a state in which the raised wall is closed.

In the vehicle front part structure according to the above-described aspect, since the seal member provides blockage between the periphery of the raised wall and the inner peripheral surface of the communication space in a state in which the whole area of the opening section of the communication portion is closed by the raised wall, smell of a package housed in the front trunk or a part of the communication portion on the vehicle front side can be prevented from reaching inside the vehicle cabin through the communication space. In addition, noise generated by unintentional movement of a package housed in the front trunk or a part of the communication portion on the vehicle front side during vehicle traveling can be prevented from being transferred into the vehicle cabin through the communication space.

In the vehicle front part structure according to the above-described aspect, the raised wall can open and close the whole area of the opening section of the communication space in a closed state, and the raised wall may partition the communication space in an airtight manner into parts on a front side and a rear side in a vehicle front-rear direction in a state in which the raised wall is closed.

In the vehicle front part structure according to the above-described aspect, since the raised wall partitions the communication space in an airtight manner into parts on the front side and the rear side, respectively, in the vehicle front-rear direction in a state in which the whole area of the opening section of the communication portion is closed by the raised wall, smell of a package housed in the front trunk or a part of the communication portion on the vehicle front side can be prevented from reaching inside the vehicle cabin through the communication space. In addition, noise generated by unintentional movement of a package housed in the front trunk or a part of the communication portion on the vehicle front side during vehicle traveling can be prevented from being transferred into the vehicle cabin through the communication space.

In the vehicle front part structure according to the above-described aspect, the vehicle cabin side housing portion may be a glove box provided at an instrument panel.

In the vehicle front part structure according to the above-described aspect, since the glove box provided at the instrument panel is used as the vehicle cabin side housing portion, space inside the vehicle cabin can be effectively utilized. Moreover, without change of arrangement in the vehicle cabin, the front trunk can be accessed from the glove box through the communication portion to move a package.

With a vehicle front part structure according to each of the above-described aspects, it is possible to prevent unintentional package movement during vehicle traveling while allowing access to a trunk from a vehicle cabin side.

DETAILED DESCRIPTION

Embodiments of the present disclosure will be described below with reference to the drawings. Note that the embodiments described below are examples of the present disclosure, and the present disclosure is not limited to the embodiments described below except for its essential configuration. Note that, in FIGS. 1 to 3, "FR" indicates a vehicle front side, "RR" indicates a vehicle rear side, "RH" indicates a vehicle right side, "LH" indicates a vehicle left side, "UP" indicates a vehicle upper side, and "LO" indicates a vehicle lower side.

First Embodiment

1. Overview of Front Part Structure of Vehicle 1

An overview of a front part structure of a vehicle 1 according to a first embodiment will be described below with reference to FIG. 1.

Figure 1:
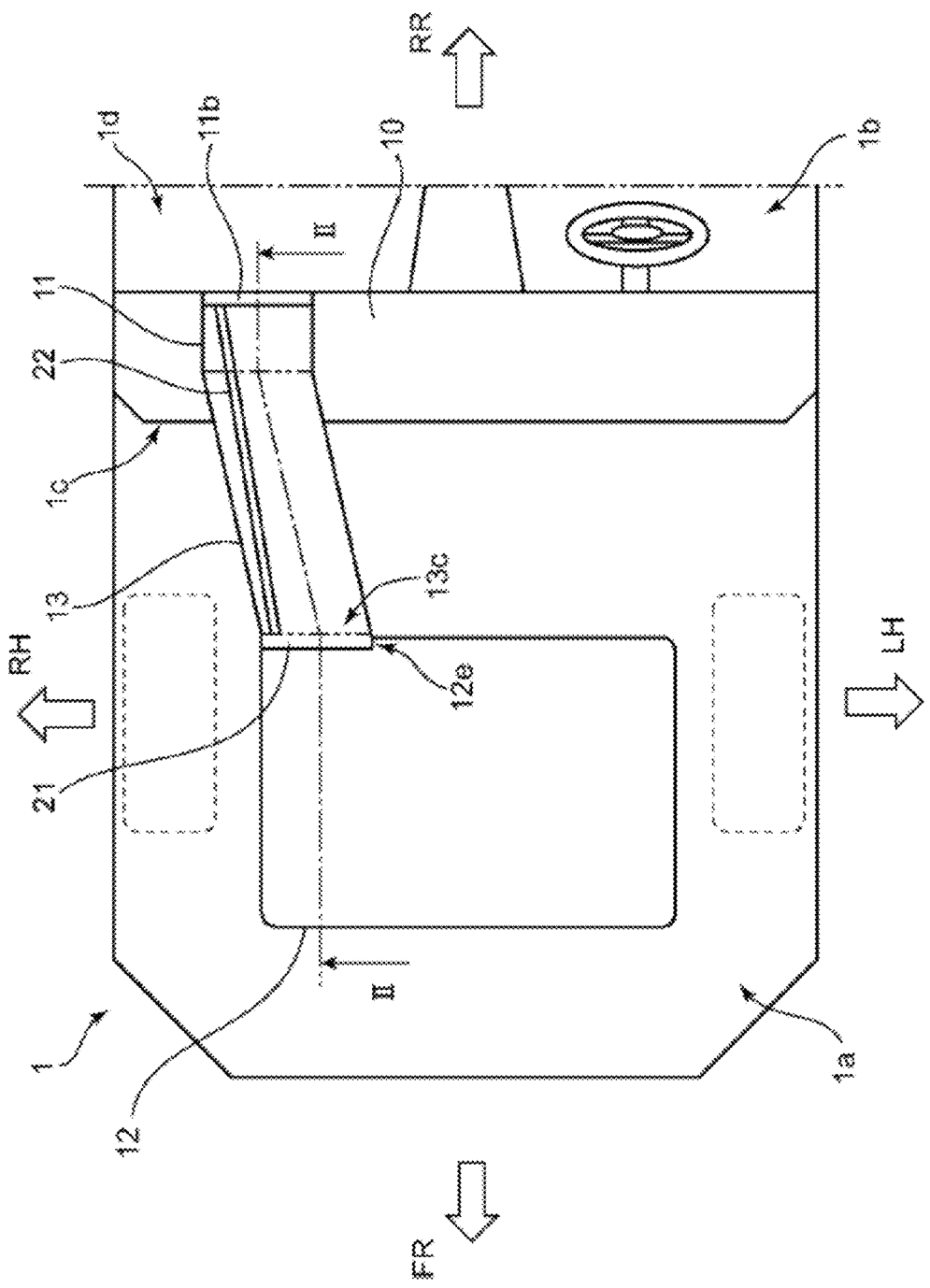
FIG. 1 is a schematic diagram illustrating a vehicle front part structure according to a first embodiment.

As illustrated in FIG. 1, the vehicle 1 according to the present embodiment includes a front trunk 12 at a front part 1a on the front side of a dash panel 1c. The front trunk 12 is disposed below a bonnet (not illustrated) and has a space that can house a package.

The vehicle 1 includes an instrument panel 10 in a vehicle cabin 1b on the rear side of the dash panel 1c. The instrument panel 10 is disposed at a front side part of the vehicle cabin 1b and extends in the right-left direction. The instrument panel 10 is provided with a glove box 11 at a part on the front side of a front passenger seat side part 1d.

The glove box 11 has a configuration with which a package can be taken in and out from the vehicle cabin 1b side. The glove box 11 of the present embodiment corresponds to a vehicle cabin side housing portion.

The vehicle 1 further includes a communication portion 13 connecting the front trunk 12 and the glove box 11. In other words, in the vehicle 1 according to the present embodiment, a housing space 12a of the front trunk 12 and a housing space 11a of the glove box 11 communicate with each other through the communication portion 13.

The vehicle 1 also includes a raised wall 21 that opens and closes an opening section of a communication space 13a of the communication portion 13, specifically, a front opening 13c that is opened on the vehicle front side in the communication space 13a, and a link bar 22 that links the raised wall 21 to opening and closing of a lid 11b of the glove box 11. The raised wall 21 of the present embodiment corresponds to a movement restriction portion that restricts movement between the front trunk 12 and the communication portion 13.

2. Configuration of Connection of Front Trunk 12 and Glove Box 11 to Communication Portion 13

The configuration of connection of the front trunk 12 and the glove box 11 to the communication portion 13 will be described below with reference to FIG. 2.

Figure 2:
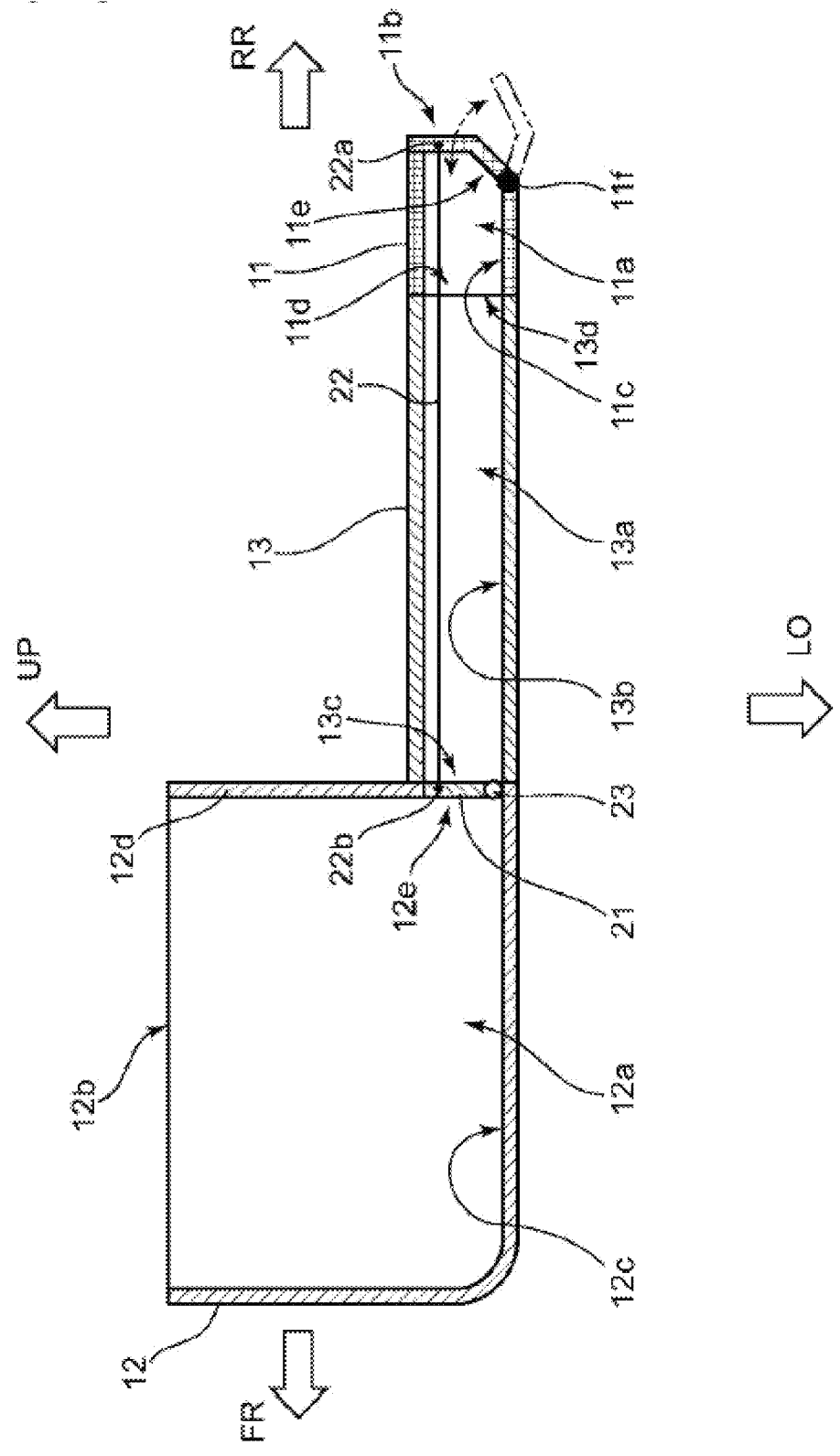
FIG. 2 is a cross-sectional view illustrating a line II-II section in FIG. 1 and is a cross-sectional view illustrating a state in which a lid of a glove box and a raised wall are closed.

As illustrated in FIG. 2, the front trunk 12 has an opening 12b on the upper side and has a rear opening 12e on the lower side of a rear wall 12d. A package can be taken into and out of the housing space 12a of the front trunk 12 through the opening 12b.

Note that, in the present embodiment, an inner bottom surface 12c of the front trunk 12 has a configuration as a substantially horizontal plane. Since the inner bottom surface 12c has a configuration as a horizontal plane, a package placed on the inner bottom surface 12c is unlikely to move to front, rear, right, and left.

The glove box 11 has a front opening 11d on the front side and has a rear opening 11e on the rear side. The rear opening 11e can be opened and closed by the lid 11b.

Figure 3:
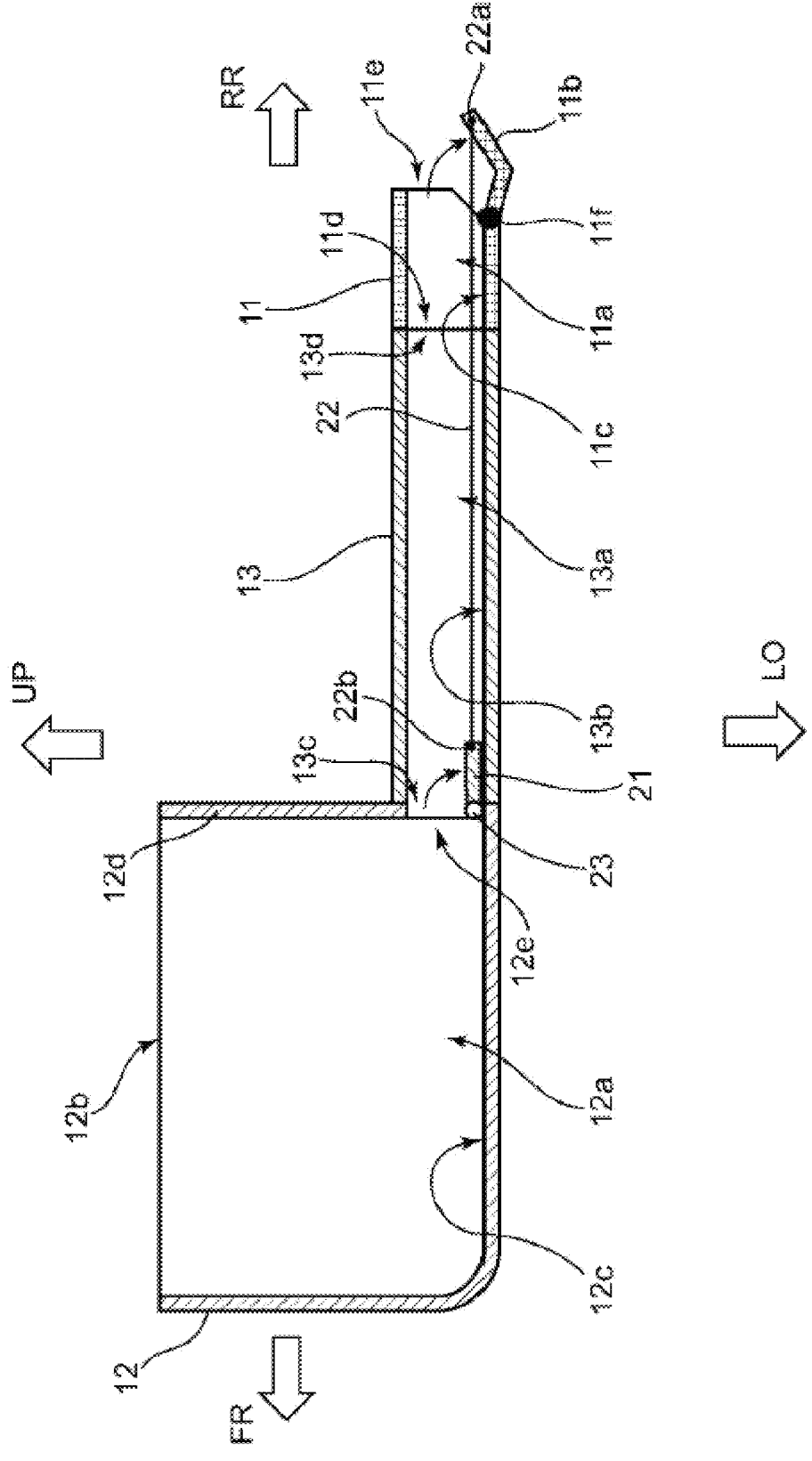
FIG. 3 is a cross-sectional view illustrating a state in which the lid of the glove box and the raised wall in FIG. 2 are opened.

A lower end part of the lid 11b is rotatably supported to a rotational shaft portion 11f extending in a vehicle width direction (direction orthogonal to the sheet of FIG. 2). Accordingly, the lid 11b can open and close the rear opening 11e by swinging in a vehicle front-rear direction with the rotational shaft portion 11f as a rotational axis as illustrated in FIGS. 2 and 3.

The housing space 11a of the glove box 11 is formed between the front opening 11d and the rear opening 11e in the front-rear direction of the vehicle 1. An inner bottom surface 11c of the glove box 11 has a configuration as a substantially horizontal plane.

The communication portion 13 has the communication space 13a extending in the front-rear direction and has a tubular configuration that its circumference is covered by a wall portion. The communication space 13a of the communication portion 13 is connected to the rear opening 12e of the housing space 12a of the front trunk 12 at the front opening 13c on the front side and connected to the front opening 11d of the housing space 11a of the glove box 11 at a rear opening 13d on the rear side. An inner bottom surface 13b of the communication portion 13 has a configuration as a substantially horizontal plane and has a configuration connected to each of the inner bottom surface 12c of the front trunk 12 and the inner bottom surface 11c of the glove box 11 without a step.

3. Configurations of Raised Wall 21 and Opening-Closing Operation Portion (in the Present Embodiment, Combination of Lid 11b and Link Bar 22) that Opens and Closes Raised Wall 21

As illustrated in FIGS. 2 and 3, the raised wall 21 serves as the movement restriction portion that is provided at the front opening 13c of the communication portion 13 to extend in the vehicle width direction (direction orthogonal to the sheets of FIGS. 2 and 3) and restricts package movement in the communication space 13a.

The raised wall 21 is arranged in the communication space 13a. Specifically, the raised wall 21 of the present embodiment is arranged in the front opening 13c of the communication space 13a, which communicates with the housing space 12a of the front trunk 12. A lower end part of the raised wall 21 is rotatably supported to a rotational shaft portion 23 extending in the vehicle width direction (direction orthogonal to the sheet of FIG. 2). Accordingly, the raised wall 21 can open and close at least part of the front opening 13c (in the present embodiment, the whole area of the front opening 13c) of the communication space 13a by swinging in the vehicle front-rear direction with the rotational shaft portion 23 as a rotational axis. In the present embodiment, the raised wall 21 can close the whole area of the front opening 13c but only needs to be able to close at least part, for example, lower half from a bottom surface of the front opening 13c to restrict package movement, and in this case, the upper side of the raised wall 21 may be opened.

In the present embodiment, since the raised wall 21 can open and close the whole area of the front opening 13c of the communication space 13a, a seal member 27 (refer to FIGS. 4 to 6) to be described later may be provided at either the periphery of the raised wall 21 or the periphery of the front opening 13c of the communication space 13a. In this case, in a state in which the raised wall 21 is closed, the smell of a package housed in the front trunk 12 can be prevented from reaching the glove box 11 on the vehicle cabin side through the communication space 13a. In addition, noise generated by unintentional package movement in the front trunk 12 during vehicle traveling can be prevented from reaching the glove box 11 on the vehicle cabin side through the communication space 13a.

The vehicle front part structure of the present embodiment includes an opening-closing operation portion that is operated to open and close the raised wall 21. The opening-closing operation portion is constituted by the lid 11b of the glove box 11 and the link bar 22 that links and connects the lid 11b and the raised wall 21.

The link bar 22 extends in a longitudinal direction of the communication portion 13 inside or outside the communication space 13a of the communication portion 13. A rear end part 22a of the link bar 22 is rotatably coupled to an upper part of the lid 11b of the glove box 11. A front end part 22b of the link bar 22 is rotatably coupled to an upper part of the raised wall 21. Accordingly, the raised wall 21 is linked and connected to the lid 11b through the link bar 22 and thus can open and close in coordination with opening-closing operation of the lid 11b. Specifically, when an occupant of the vehicle 1 opens the lid 11b of the glove box 11, the upper part of the raised wall 21 is pulled toward the vehicle rear side by the link bar 22 so that the raised wall 21 can open while inclining to the vehicle rear side. When the lid 11b is closed, the upper part of the raised wall 21 is pressed toward the vehicle front side by the link bar 22 so that the raised wall 21 can close while standing up toward the vehicle front side.

At least one link bar 22 needs to be arranged inside or outside the communication space 13a, and two or more link bars may be arranged depending on the shape and size of the communication space 13a.

4. Effect

The front part structure of the vehicle 1 of the present embodiment includes the front trunk 12 at the front part 1a of the vehicle 1, the glove box 11 at the front part of the vehicle cabin 1b, and the communication portion 13 having the communication space 13a providing communication between the housing space 12a of the front trunk 12 and the housing space 11a of the glove box 11. Accordingly, it is possible to ensure a housing space in which a package can be accessed from both inside and outside the vehicle cabin 1b while enlarging housing capacity of a trunk of the vehicle 1.

Moreover, since the raised wall 21 as the movement restriction portion that restricts package movement in the communication space 13a is provided at the communication portion 13, packages housed in the front trunk 12 or the communication portion 13 can be prevented from unintentionally moving in the front-rear direction during vehicle traveling.

Note that the movement restriction portion in the present disclosure may be not only the above-described raised wall 21 but also any member that can restrict a package in the communication space 13*a*, and the movement restriction portion of the present disclosure also includes a projection or bar-shaped body protruding inside the communication space 13*a* from the inner peripheral surface of the communication portion 13.

The movement restriction portion of the present embodiment is the raised wall 21 that is arranged in the communication space 13*a* (in the present embodiment, the front opening 13*c* of the communication space 13*a*) communicating with the housing space 12*a* of the front trunk 12 in the communication space 13*a* and can be displaced between a closed position where package movement is restricted by partitioning of at least part of the opening section of the communication space 13*a* and an opened position where the movement restriction is canceled (note that the opening section is a transverse cross section at an optional position in the entire longitudinal direction of the communication space 13*a*, and the front opening 13*c* and the rear opening 13*d* are included in the opening section). Thus, during vehicle traveling, the raised wall 21 closes at least part of the opening section of the communication space 13*a* (in the present embodiment, the whole area of the front opening 13*c*) in the communication portion 13, thereby preventing unintended package movement in the communication space 13*a*. When a package is taken into and out of the front trunk 12, the raised wall 21 is opened to cancel the movement prevention so that package movement in the communication space 13*a* can be smoothly performed.

Note that the raised wall 21 only needs to partition at least part of the opening section of the communication space 13*a*, and thus may be arranged at an optional position other than the front opening 13*c* at a front end part of the communication space 13*a*, for example, an optional position between the front opening 13*c* and the rear opening 13*d* in the longitudinal direction of the communication space 13*a*. Moreover, the raised wall 21 only needs to be able to restrict package movement by partitioning at least part of the opening section of the communication space 13*a*, and thus may have, for example, a configuration that closes $\frac{1}{10}$ to $\frac{1}{2}$ approximately of the opening section in the height direction from a lowest position at the opening section of the communication space 13*a* (for example, the front opening 13*c*).

The front part structure of the vehicle 1 of the present embodiment further includes combination of the lid 11*b* of the glove box 11 and the link bar 22 as the opening-closing operation portion that is operated to open and close the raised wall 21. Thus, with combination of the lid 11*b* and the link bar 22 as the opening-closing operation portion, when desiring to open and close the raised wall 21, an occupant of the vehicle 1 can optionally open and close the raised wall 21 by performing an operation to open and close the raised wall 21 by using the opening-closing operation portion (in other words, the lid 11*b* and the link bar 22).

In addition, in the present embodiment, since the opening-closing operation portion includes the lid 11*b* of the glove box 11, an operation member for performing an operation to open and close the raised wall does not need to be provided in the vehicle cabin 1*b* in addition to the lid 11*b*, and thus the configuration of the front part of the vehicle cabin 1*b* can be simplified. Moreover, since the raised wall 21 opens and closes in coordination with opening-closing operation of the lid 11*b*, an operation to open and close the raised wall 21 can be easily performed.

Further, it is possible to open the raised wall 21 in coordination with opening operation of the lid 11*b* when opening the lid 11*b* of the glove box 11 and taking in and out a package, and an occupant can move the package to an optional place in the front trunk 12 or the communication portion 13 while visually recognizing the package.

Note that, in the present embodiment, the raised wall 21 only needs to open and close in coordination with opening-closing operation of the lid 11*b*, and thus not only an aspect that the raised wall 21 is opened in coordination with opening operation of the lid 11*b* as described above but also an aspect that the raised wall 21 is closed in coordination with opening operation of the lid 11*b* are applicable. In this case, the raised wall 21 may be opened in coordination with closing operation of the lid 11*b*. In such an aspect, since any one of the lid 11*b* and the raised wall 21 is opened and the other is closed, it is possible to prevent a state in which the housing space 12*a* of the front trunk 12 and the vehicle cabin 1*b* communicate with each other, and it is possible to prevent smell in the housing space 12*a* from flowing into the vehicle cabin 1*b*.

Further, in the above-described embodiment, the glove box 11 provided at the instrument panel 10 is used as an example of the vehicle cabin side housing portion of the present disclosure. Space in the vehicle cabin 1*b* can be effectively utilized by using the glove box provided at the instrument panel 10 as the vehicle cabin side housing portion. Moreover, the front trunk 12 can be accessed from the glove box 11 through the communication portion 13 to move a package without change of arrangement in the vehicle cabin 1*b*.

Furthermore, in the front part structure of the vehicle 1 illustrated in FIGS. 1 to 3, the raised wall 21 can open and close the whole area of the opening section of the communication space 13*a* in a closed state, and the raised wall 21 may partition the communication space 13*a* in an airtight manner into parts on the front side and the rear side, respectively, in the vehicle front-rear direction (for example, partitions in an airtight manner by using the seal member 27 to be described later) in a state in which the raised wall 21 is closed.

With this configuration, in a state in which the whole area of the opening section of the communication portion 13 is closed by the raised wall 21, the raised wall 21 partitions the communication space 13*a* in an airtight manner parts on the front side and the rear side, respectively, in the front-rear direction of the vehicle 1, and thus smell of a package housed in the front trunk 12 or the part on the front side of the vehicle 1 in the communication portion 13 can be prevented from reaching inside the vehicle cabin 1*b* through the communication space 13*a*. In addition, noise generated by movement of a package housed in the front trunk 12 or the part of the communication portion 13 on the front side in the vehicle 1 during traveling of the vehicle 1 can be prevented from being transferred into the vehicle cabin 1*b* through the communication space 13*a*.

Note that, the opening-closing operation portion in the present disclosure is not limited to the above-described configuration including the lid 11*b* but may be provided with an operation member (a pressing operation lever 24 in FIG. 4 or a pulling operation lever 28 in FIG. 5) separately from the lid 11*b* as in second to third embodiments below.

Second Embodiment

Figure 4:
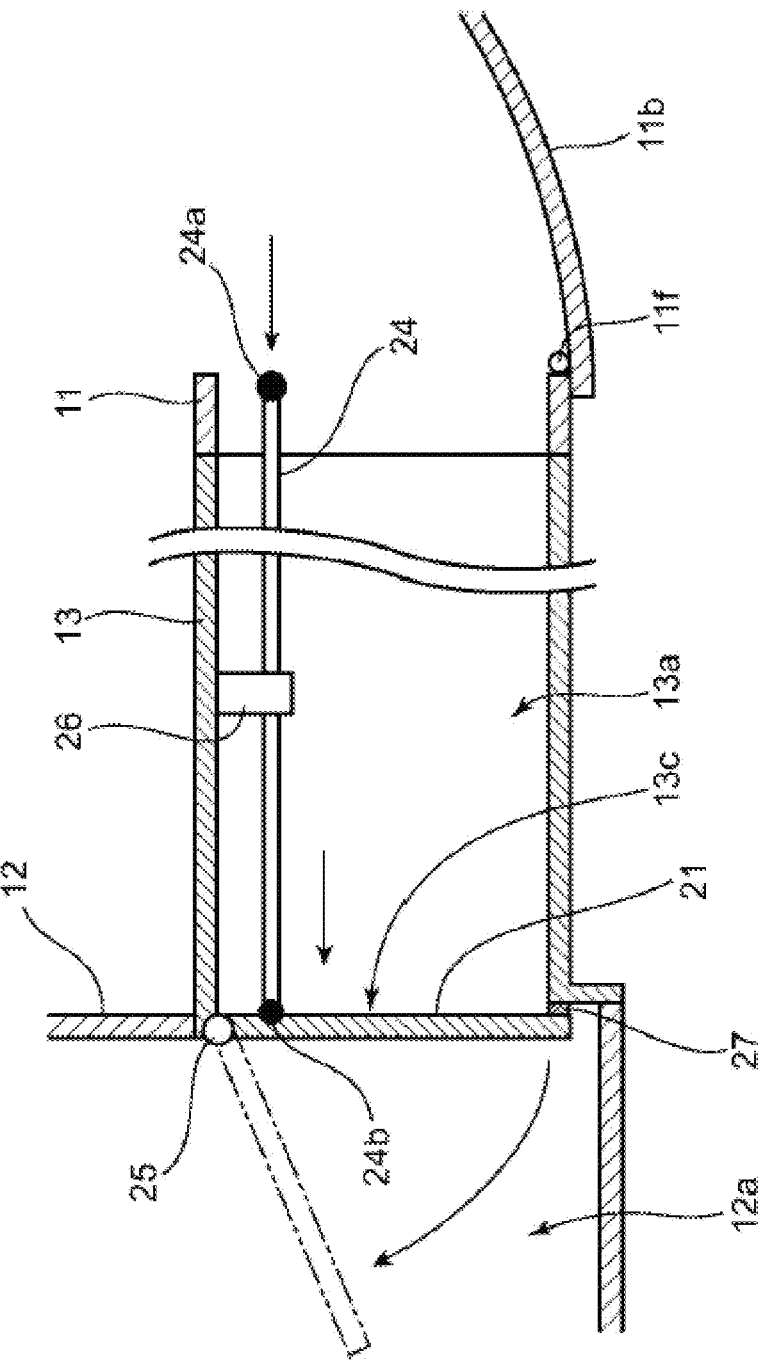
FIG. 4 is a cross-sectional view of a structure including a press lever with which the raised wall as part of a vehicle front part structure according to a second embodiment is opened while being pressed.

As illustrated in FIG. 4, a front part structure of the vehicle 1 of the second embodiment is the same as the front part structure of the first embodiment in that the glove box 11, the front trunk 12, and the communication portion 13 illustrated in FIGS. 1 to 3 are provided, but is largely different therefrom in that the pressing operation lever 24 is provided as the opening-closing operation portion separately from the lid 11*b*.

Specifically, in the front part structure of the vehicle 1 of the second embodiment, the opening-closing operation portion includes the pressing operation lever 24 as an operation member that extends in the longitudinal direction of the communication portion 13 and opens and closes the raised wall 21 by moving in the longitudinal direction. The pressing operation lever 24 only needs to extend in the longitudinal direction of the communication portion 13 and be provided inside or outside the communication space 13*a* of the communication portion 13. In the present embodiment, the pressing operation lever 24 is supported to be freely movable back and forth in a longitudinal direction of the pressing operation lever 24 by a lever support portion 26 provided on a ceiling surface of the communication space 13*a* inside the communication space 13*a*.

The pressing operation lever 24 includes an operation end part 24*a* provided inside or around the glove box 11, and a coupling end part 24*b* coupled to the raised wall 21. The coupling end part 24*b* is rotatably supported to the upper part of the raised wall 21. An upper end part of the raised wall 21 in FIG. 4 is rotatably supported to a rotational shaft portion 25 extending in the vehicle width direction (direction orthogonal to the sheet of FIG. 4). The operation end part 24*a* is housed, for example, inside the glove box 11. Alternatively, the operation end part 24*a* may be provided at a position around the glove box 11 where an occupant in the vehicle cabin can hold and operate the operation end part 24*a*.

With the front part structure of the vehicle 1 including the pressing operation lever 24 illustrated in FIG. 4, an occupant can easily perform an operation of opening the raised wall 21 toward the vehicle front side by performing an operation of holding the operation end part 24*a* of the pressing operation lever 24 and pressing the pressing operation lever 24 in the vehicle cabin 1*b*. The raised wall 21 can be closed by its own weight when the operation of pressing the pressing operation lever 24 is stopped. Thus, it is possible to easily perform an operation to open and close the raised wall 21 with the pressing operation lever 24.

Moreover, it is possible to open and close the raised wall 21 at an optional timing while maintaining a state in which the lid 11*b* of the glove box 11 is opened, and thus an occupant in the vehicle cabin 1*b* can reliably check an opened-closed state of the raised wall 21.

Further, in the front part structure of the vehicle 1 illustrated in FIG. 4, the raised wall 21 can open and close the whole area of the front opening 13*c* of the communication space 13*a* in the closed state.

In addition, the front part structure of the vehicle 1 illustrated in FIG. 4 includes the seal member 27 that provides blockage across the entire circumference between the periphery of the raised wall 21 and the inner peripheral surface of the communication space 13*a*, in the present embodiment, an opening edge of the front opening 13*c* in a state in which the raised wall 21 is closed. A highly airtight elastic material made of resin, rubber, or the like is used as the seal member 27 and preferably, for example, an EPDM rubber foamed body called EPTSEALER (registered trademark).

Note that, in the closed state, the raised wall 21 illustrated in FIG. 4 may be arranged inside the communication space

13*a* instead of the front opening 13*c* of the communication space 13*a* and able to open and close the whole area of the opening section of the communication space 13*a* at a halfway position in the longitudinal direction. In this case, the seal member 27 may be arranged to provide blockage between the periphery of the raised wall 21 and the inner peripheral surface of the communication space 13*a* in a state in which the raised wall 21 is closed.

In the front part structure of the vehicle 1 illustrated in FIG. 4, since the seal member 27 provides blockage between the periphery of the raised wall 21 and the opening edge of the front opening 13*c* in a state in which the whole area of an opening section (in the present embodiment, the front opening 13*c*) of a communication space 3*a* of the communication portion 13 is closed by the raised wall 21, smell of a package housed in the front trunk 12 or the part of the communication portion 13 on the front side in the vehicle 1 can be prevented from reaching inside the vehicle cabin 1*b* through the communication space 13*a*. In addition, noise generated by movement of a package housed in the front trunk 12 or the part of the communication portion 13 on the vehicle front side during traveling of the vehicle 1 can be prevented from being transferred into the vehicle cabin 1*b* through the communication space 13*a*.

Note that the seal member 27 only needs to be provided at any one of the periphery of the raised wall 21 and the inner peripheral surface of the communication space 13*a*.

In the front part structure of the vehicle 1 illustrated in FIG. 4, as well, the raised wall 21 can open and close the whole area of the opening section of the communication space 13*a* in the closed state, and the raised wall 21 may partition the communication space 13*a* in an airtight manner into parts on the front side and the rear side, respectively, in the vehicle front-rear direction (for example, partitions in an airtight manner by using the above-described seal member 27) in a state in which the raised wall 21 is closed.

With this configuration, since the raised wall 21 partitions the communication space 13*a* in an airtight manner into parts on the front side and the rear side, respectively, in the front-rear direction of the vehicle 1 in a state in which the whole area of the opening section of the communication portion 13 is closed by the raised wall 21, the smell of a package housed in the front trunk 12 or the part of the communication portion 13 on the front side in the vehicle 1 can be prevented from reaching inside the vehicle cabin 1*b* through the communication space 13*a*. In addition, noise generated by movement of a package housed in the front trunk 12 or the part of the communication portion 13 on the front side in the vehicle 1 during traveling of the vehicle 1 can be prevented from being transferred into the vehicle cabin 1*b* through the communication space 13*a*.

Third Embodiment

Figure 5:
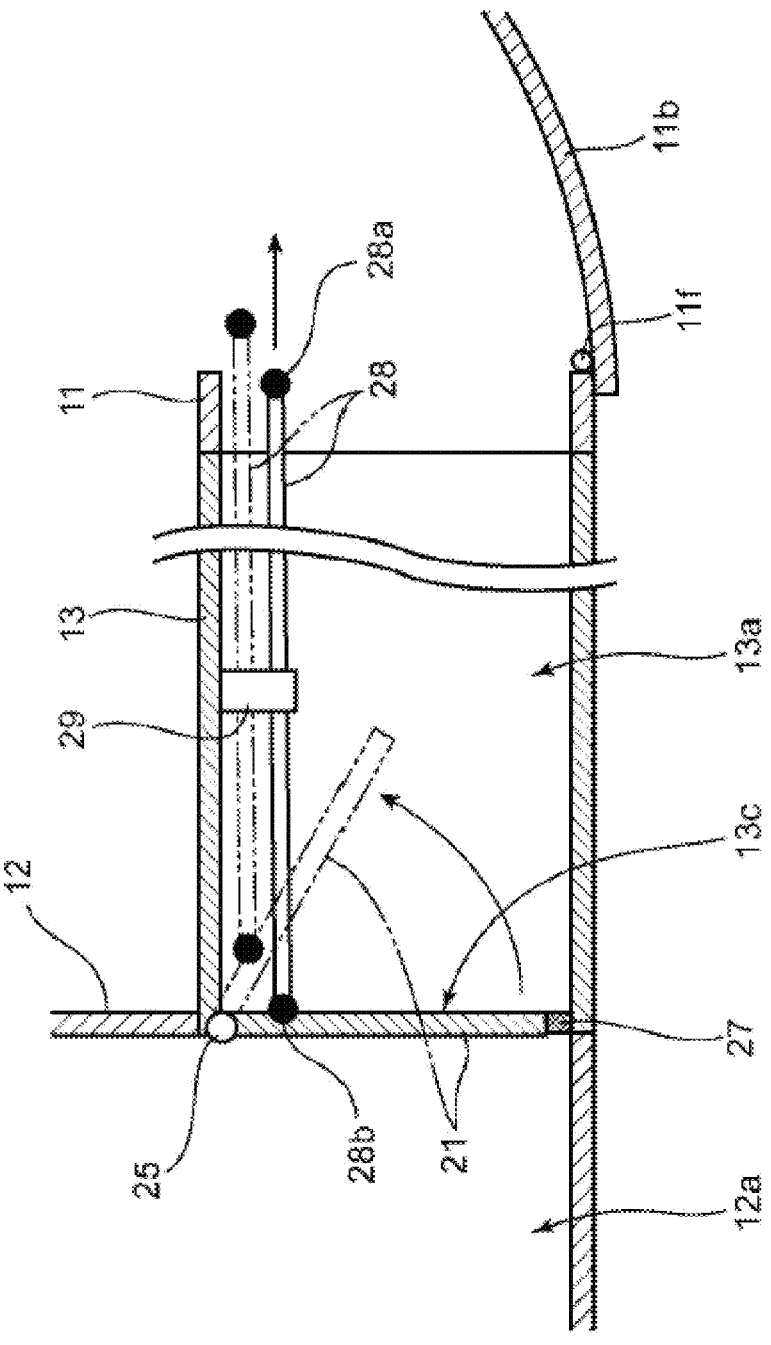
FIG. 5 is a cross-sectional view of a structure including a pulling operation lever with which the raised wall as part of a vehicle front part structure according to a third embodiment is opened while being pulled.

As illustrated in FIG. 5, the pulling operation lever 28 may be provided as the opening-closing operation portion in place of the pressing operation lever 24 of the above-described second embodiment.

Specifically, in a front part structure of the vehicle 1 of the third embodiment, the opening-closing operation portion includes the pulling operation lever 28 as an operation member that extends in the longitudinal direction of the communication portion 13 and opens and closes the raised wall 21 by moving in the longitudinal direction. The pulling operation lever 28 only needs to extend in the longitudinal direction of the communication portion 13 and be provided inside or outside the communication space 13*a* of the communication portion 13. In the present embodiment, the pulling operation lever 28 is supported to be freely movable back and forth in a longitudinal direction of the pulling operation lever 28 by a lever support portion 29 provided on the ceiling surface of the communication space 13*a* inside the communication space 13*a*.

The pulling operation lever 28 includes an operation end part 28*a* provided inside or around the glove box 11, and a coupling end part 28*b* coupled to the raised wall 21. The coupling end part 28*b* is rotatably supported to the upper part of the raised wall 21. The upper end part of the raised wall 21 in FIG. 5 is rotatably supported to the rotational shaft portion 25 extending in the vehicle width direction (direction orthogonal to the sheet of FIG. 5). The operation end part 28*a* is housed, for example, inside the glove box 11.

With the front part structure of the vehicle 1 including the pulling operation lever 28 illustrated in FIG. 5, an occupant can easily perform an operation of opening the raised wall 21 toward the vehicle rear side by performing an operation of holding the operation end part 28*a* of the pulling operation lever 28 and pulling the pulling operation lever 28 in the vehicle cabin 1*b*. The raised wall 21 can be closed by its own weight when the operation of pulling the pulling operation lever 28 is stopped. Thus, it is possible to easily perform an operation to open and close the raised wall 21 with the pulling operation lever 28.

Moreover, it is possible to open and close the raised wall 21 at an optional timing while maintaining a state in which the lid 11*b* of the glove box 11 is opened, and thus an occupant in the vehicle cabin 1*b* can reliably check the opened-closed state of the raised wall 21.

In the front part structure of the vehicle 1 illustrated in FIG. 5, the raised wall 21 has a configuration that opens toward the vehicle rear side, and thus as for arrangement of the seal member 27 at the lower end part of the raised wall 21, the seal member 27 may be arranged at either the lower end part of the raised wall 21 or a bottom surface of the communication space 13*a*.

Figure 6:
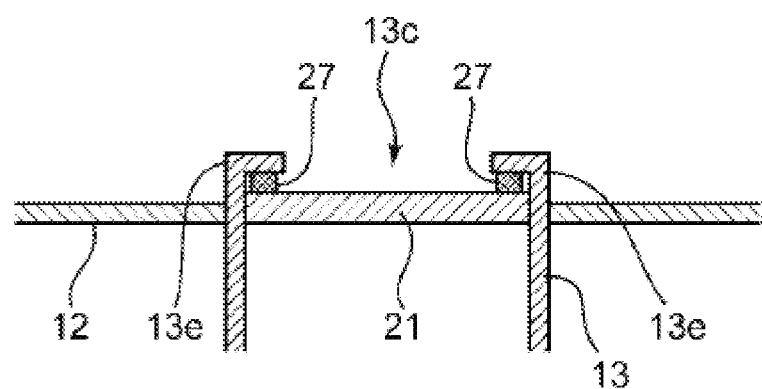
FIG. 6 is a cross-sectional view of the raised wall and its peripheral part in FIG. 5 when cut in a horizontal direction.

In a horizontal cross-sectional view of the raised wall 21 in the closed state illustrated in FIG. 6, both side edges of a surface of the raised wall 21 on the vehicle front side contact a pair of L-shaped frame parts 13*e* on respective sides in the vehicle width direction at the front opening 13*c* of the communication portion 13. Thus, the seal member 27 may be arranged at either the side edges of the surface of the raised wall 21 on the vehicle front side or the pair of L-shaped frame parts 13*e*.

Other Embodiments

As other aspects of the opening-closing operation portion that is operated to open and close the raised wall in the present disclosure, for example, an operation member such as a wire or a cable, and an electric operation mechanism such as a solenoid, other than the lid 11*b* of the first embodiment and the operation members such as the pressing operation lever 24 of the second embodiment and the pulling operation lever 28 of the third embodiment described above, are included in the opening-closing operation portion of the present disclosure.

MODIFICATIONS

In each of the above-described first to third embodiments, a connection counterpart of the communication portion 13 on the vehicle cabin 1*b* side is the glove box 11, but the connection counterpart of the communication portion on the vehicle cabin side in the present disclosure is not limited thereto. A housing portion different from a glove box may be provided at an upper or lower part of the instrument panel, and the housing portion may be the connection counterpart of the communication portion. However, in this case, the housing portion needs to be provided with an openable and closable lid in terms of prevention of smell leakage, package slippage, and the like.

Moreover, in each of the above-described first to third embodiments, since the connection counterpart of the communication portion 13 on the vehicle cabin 1*b* side is the glove box 11, the vehicle cabin side housing portion is arranged at the front passenger seat side part 1*d* of the vehicle cabin 1*b*, but the present disclosure is not limited thereto. For example, the vehicle cabin side housing portion may be provided at a front side part of a steering wheel at the instrument panel, or the vehicle cabin side housing portion may be provided on the front side between a driver seat and a front passenger seat.

Further, in each of the above-described first to third embodiments, one front trunk 12 is provided at the front part 1*a* of the vehicle 1, but in the present disclosure, a plurality of front trunks may be provided at the front part of the vehicle. In this case, at least one of the front trunks only needs to be connected to the vehicle cabin side housing portion through the communication portion.

What is claimed is:

1. A vehicle front part structure comprising:
   a front trunk disposed at a vehicle front part on a front side of a vehicle cabin of a vehicle and having a front housing space that can house a package;
   a vehicle cabin side housing portion disposed at a front part of the vehicle cabin, the vehicle cabin side housing portion having a vehicle cabin side housing space into and out of which a package can be taken from the vehicle cabin side, and provided with a lid to open and close an opening of the vehicle cabin side housing space on the vehicle cabin side;
   a communication portion having a communication space providing communication between the front housing space and the vehicle cabin side housing space; and
   a movement restriction portion that is provided at the communication portion and restricts package movement in the communication space.

2. The vehicle front part structure according to claim 1, wherein the movement restriction portion is a raised wall that is arranged in the communication space and is movable between a closed position where movement of the package is restricted by partitioning of at least part of an opening section of the communication space and an opened position where the movement restriction is canceled.

3. The vehicle front part structure according to claim 2, further comprising an opening-closing operation portion that is operated to open and close the raised wall.

4. The vehicle front part structure according to claim 3, wherein
   the opening-closing operation portion includes the lid of the vehicle cabin side housing portion, and
   the raised wall is opened and closed in coordination with an opening-closing operation of the lid.

5. The vehicle front part structure according to claim 3, wherein
   the opening-closing operation portion includes an operation member that extends in a longitudinal direction of the communication portion and opens and closes the raised wall by moving in the longitudinal direction, and the operation member includes a coupling end part coupled to the raised wall, and an operation end part provided inside or around the vehicle cabin side housing portion.

6. The vehicle front part structure according to claim 2, wherein the raised wall is for opening and closing a whole area of the opening section of the communication space in a closed state, and the vehicle front part structure further includes a seal member that provides blockage between a periphery of the raised wall and an inner peripheral surface of the communication space in a state in which the raised wall is closed.

7. The vehicle front part structure according to claim 2, wherein the raised wall is for opening and closing a whole area of the opening section of the communication space in a closed state, and the raised wall partitions the communication space in an airtight manner into parts on a front side and a rear side in a vehicle front-rear direction in a state in which the raised wall is closed.

8. The vehicle front part structure according to claim 1, wherein the vehicle cabin side housing portion is a glove box provided at an instrument panel.

9. The vehicle front part structure according to claim 2, wherein the vehicle cabin side housing portion is a glove box provided at an instrument panel.

10. The vehicle front part structure according to claim 3, wherein the vehicle cabin side housing portion is a glove box provided at an instrument panel.

11. The vehicle front part structure according to claim 4, wherein the vehicle cabin side housing portion is a glove box provided at an instrument panel.

12. The vehicle front part structure according to claim 5, wherein the vehicle cabin side housing portion is a glove box provided at an instrument panel.

13. The vehicle front part structure according to claim 6, wherein the vehicle cabin side housing portion is a glove box provided at an instrument panel.

14. The vehicle front part structure according to claim 7, wherein the vehicle cabin side housing portion is a glove box provided at an instrument panel.

\* \* \* \* \*